Patented Nov. 8, 1949

2,487,075

UNITED STATES PATENT OFFICE 2,487,075

ARYL-ALICYCLIC CARBOXYLIC ACIDS AND PROCESS FOR THEIR MANUFACTURE

Erwin Schwenk, Montclair, N. J., and Domenick Papa, Brooklyn, N. Y., assignors to Schering Corporation, Bloomfield, N. J., a corporation of New Jersey No Drawing. Application November 13, 1948, Serial No. 59,966. In Canada January 30, 1947

9 Claims. (Cl. 260—520)

The present invention relates to the manufacture of aryl-alicyclic carboxylic acids, that is, aliphatic carboxylic acids substituted on different carbon atoms by an aryl radical and an alicyclic radical, the term "alicyclic" being employed generically to cover both saturated and unsaturated cyclo-aliphatic radicals, including those having internal ring structures, such as the hexahydrobenzene, tetrahydrobenzene, tetralyl, terpene and terpene-like radicals, and cyclopentane and cyclopentene radicals.

The present application is a continuation in part of our copending application Serial No. 544,831, filed July 13, 1944, now abandoned.

We have found that aromatic aldehydes wherein the double bond of the aldehyde group forms part of a conjugated double bond system, as in the case, for example, of benzaldehyde and cinnamaldehyde, can be condensed with alicyclically substituted aliphatic carboxylic acids, provided that such acids have an olefinic double bond in activating position with reference to a methylene group in α-position to the carboxyl, such as cycloalkene acetic acid and the cycloalkene-substituted homologous acids, and likewise the corresponding cycloalkylidene acetic and homologous acids, having in the α-position to the carboxylic group either a methylene radical or the group =CH—, to form dicyclic alkene carboxylic acids, substituted on the α-carbon by the cycloalkene radical and on another carbon by the phenyl group.

The condensation reaction of the present invention yields compounds which display a high order of bactericidal efficacy against a wide variety of pathogenic organisms. These compounds are particularly effective against organisms known to cause stubborn infections of the urinary tract. In addition to their bactericidal efficiency, the compounds also have the unexpected, but desirable, property of acidifying the urine. Clinical experience has shown that they are effective against urinary tract infections caused by *Proteus vulgaris*, *B. pyocyaneus*, *L. aerogenes* and *Strep. fecalis*. The clinical efficacy of the compounds has been particularly outstanding for the treatment of chronic urinary tract infections which have failed to respond to sulfonamide and antibiotic therapy.

The compounds have also shown value in the clinical treatment of certain types of amebic infections, particularly those associated with bacterial infections. In chronic shigellosis caused by such organisms as *Shigella sonnei*, *S. paradysenteria* and *S. alkalescens*, the compounds have been extremely well tolerated and have proved clinically successful. As observed in cases of urinary tract infections, many of the cases of chronic shigellosis have responded to treatment with the compounds of this invention, where sulfonamide therapy proved of little value. Of particularly high efficiency is α-(Δ¹-cyclohexenyl) p-hydroxyl cinnamic acid.

The products of the present invention are useful also as intermediates for synthetic reactions, such as the production of cyclopentano-polyhydrophenanthrene compounds or the manufacture of iodinated compounds suitable for use as contrast agents in roentgenographic diagnosis.

According to the present invention, alicyclic carboxylic acids of olefinic character, like Δ¹-cycloalkene acetic acid, the isomeric cycloalkylidene acetic acid, and the homologous acids, having a reactive methylene group (or a group convertible thereinto, such as

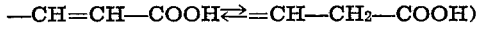

—CH=CH—COOH⇌=CH—CH₂—COOH)

in the α-position to the carboxyl group, and either substituted or unsubstituted in the nucleus, are condensed in accordance with the Perkin reaction, or by various modifications of the Perkin reaction, and preferably although not necessarily in the form of the anhydrous alkali metal, such as potassium salt, or in the form of the free acid and with the aid of a catalyst like a tertiary amine, such as triethyl or tributyl amine, with benzaldehyde, cinnamaldehyde or other aromatic aldehydes wherein the double bond of the aldehyde group forms part of a conjugated double bond system, the nucleus of the aldehyde being substituted or unsubstituted, to form a new class of compounds which may be designated as aryl alicyclic alkene carboxylic acids and their salts. This reaction was quite surprising in view of the fact that the cycloalkane carboxylic acids do not take part in a Perkin type of reaction. Thus we have heated the anhydrous sodium salt of cyclohexyl acetic acid with benzaldehyde in the presence of acetic anhydride and were able to isolate only cinnamic acid (produced by reaction of the benzaldehyde with acetic anhydride), but not even traces of the expected cyclohexyl cinnamic acid.

The products may, if desired, be hydrogenated in any suitable manner to produce aryl alicyclic alkane carboxylic acids and their salts.

The starting compounds, or only one of them, may contain substituting groups like hydroxyl, ether and ester groups, and halogen groups, preferably iodine. Thus, 3,5-diiodo-4-hydroxy benzaldehyde, 2,4,6-triiodo-5-hydroxy benzaldehyde, 3,4-diiodo benzaldehyde and the corresponding derivatives of cinnamaldehyde and higher aldehydes may be employed.

The reaction according to the invention is illustrated by the following equations:

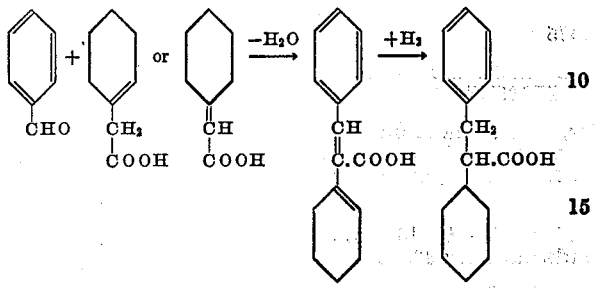

The production of intermediates suitable for the synthesis of cyclopentano polyhydro phenanthrene compounds is shown by the following:

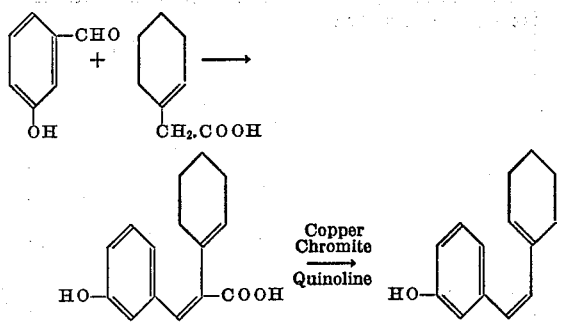

Iodinated compounds suitable for the manufacture of, or use as, contrast agents for roentgenography may, in accordance with the invention, be prepared in the following manner:

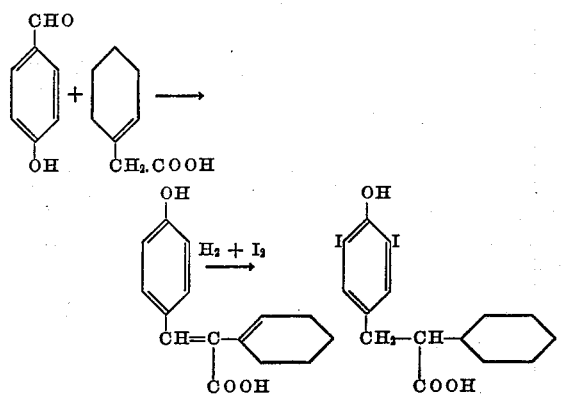

However, the iodine may be contained in one of the starting compounds as is shown by the following:

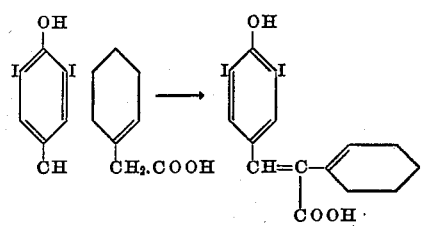

Analogous condensation products can be prepared in accordance with the foregoing principles from terpene and terpene-like compounds. The following reactions with menthone are representative of the application of this condensation procedure to this class of compounds.

Menthone can be converted to a carboxylic acid as follows:

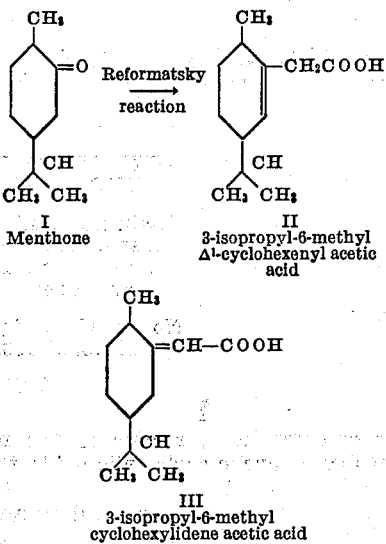

I
Menthone

II
3-isopropyl-6-methyl
$\Delta^1$-cyclohexenyl acetic acid

III
3-isopropyl-6-methyl
cyclohexylidene acetic acid

For the Reformatsky reaction on menthone see Wallach and Tholke, Ann. 323, 151 (1902).

Compounds II and III with aromatic aldehydes give compounds of general formula

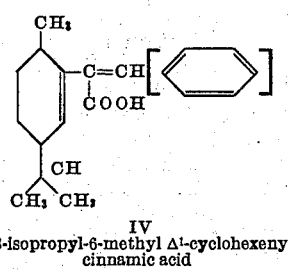

IV
α(3-isopropyl-6-methyl $\Delta^1$-cyclohexenyl) cinnamic acid substituted or not in the aromatic nucleus.

In a similar fashion, the compound 3,3,5-trimethyl cyclohexanone can be converted to the corresponding alicyclically substituted cinnamic acids.

Compound IV on reduction gives α-(3-isopropyl 6-methyl cyclohexyl) β-phenyl propionic acid of the following formula:

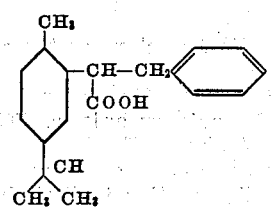

The corresponding derivatives of the higher unsaturated and (after hydrogenation) saturated aliphatic acids, and of alkadiene carboxylic acids, may be prepared by the use of the appropriate starting compounds, as will be evident to those skilled in the art from the above disclosure. Where products non-iodinated in the phenyl radical but containing a hydroxyl group or a functional derivative thereof, are obtained, the same may be iodinated in known manner, preferably after saturation of the alkene chain, to produce diiodo derivatives suitable for use as contrast agents.

The following examples illustrate specific procedures in accordance with the invention.

EXAMPLE I

α-(Δ¹-Cyclohexenyl) cinnamic acid

A mixture of 17.9 g. of anhydrous potassium-Δ¹-cyclohexenyl acetate and 10.6 g. of benzaldehyde was heated for 8 hours at 105° C. with 100 cc. of acetic anhydride. The reaction mixture was then cooled to 60° and the excess acetic anhydride cautiously decomposed with water. The reaction mixture was poured on ice and the semisolid residue extracted with ether. The acidic fraction was isolated from the ether by extraction with sodium carbonate solution. On acidification of the sodium carbonate extracts the α-(Δ¹-cyclohexenyl) cinnamic acid was obtained in the form of a pale yellow solid melting at 150–152° C. On recrystallization from a mixture of acetone and water the acid was obtained in the form of long white fine needles, melting at 156–157° C.

By the use of the isomeric anhydrous potassium cyclohexylidene acetate, this condensation yields the same product. It is advisable when using this acid to heat the reaction mixture for a few additional hours in order to secure a comparable yield.

The α(Δ¹-cyclohexenyl) cinnamic acid was reduced as follows: 10 g. of the acid were dissolved in 200 cc. of 10% sodium hydroxide. The mixture was heated to 90° C. and with stirring 15 g. of Raney nickel aluminum alloy added in the course of about one hour. The mixture was stirred for an additional hour at the same temperature, then filtered by decantation from the nickel, and the nickel washed twice with hot water. On acidification of the filtrate and washings to Congo red paper with concentrated HCl the crude β-phenyl-α-cyclohexyl propionic acid was obtained in a yield of 10 g., melting at 62–65° C. On recrystallization from a mixture of benzene and petroleum ether the reduced acid was obtained as long fine white needles melting at 70–71° C.

EXAMPLE II

α-(Δ¹-Cyclohexenyl) p-hydroxy cinnamic acid

Using either anhydrous potassium-Δ¹-cyclohexenyl acetate or anhydrous potassium cyclohexylidene acetate with p-hydroxy benzaldehyde under the conditions as described in Example I, the α-(Δ¹-cyclohexenyl) p-hydroxy cinnamic acid is obtained after recrystallization from acetone and water as long white needles melting at 194–195° C.

When α-(Δ¹-cyclohexenyl) p-hydroxy cinnamic acid was reduced as described in Example I, a quantitative yield of β-(p-hydroxy phenyl)-α-cyclohexyl propionic acid was obtained. Recrystallized from a mixture of acetone and water the substituted propionic acid was obtained as fine white needles melting at 180–181° C.

EXAMPLE III

α-(Δ¹-Cyclopentenyl) p-hydroxy cinnamic acid

Following the general procedure described for Example I, this acid is obtained by condensing either potassium cyclopentenyl or potassium cyclopentylidene acetate with p-hydroxy benzaldehyde. The product is obtained in the form of white needles which melt at 183° C. with decomposition.

The α-(Δ¹-cyclopentenyl) p-hydroxy cinnamic acid when reduced as described in Example I yields the α-cyclopentane-β-(p-hydroxy phenyl) propionic acid which melts at 175–178° C. Recrystallized from acetone and water the product was obtained as white needles melting at 180–181° C.

EXAMPLE IV

α-(α-6-methoxy-3,4 dihydro naphthalene) p-hydroxy cinnamic acid

Using the general procedure described in Example I, 12.8 g. of anhydrous potassium-6-methoxy-1-tetralidene acetate, 6.1 g. of p-hydroxy benzaldehyde and 100 cc. of acetic anhydride were heated for 10 to 12 hours at 105–110° C. The condensation product was isolated by the ether sodium carbonate extraction method, and after several recrystallizations from benzene and petroleum ether it melted at 189–191° C. with decomposition.

EXAMPLE V

The syntheses as outlined in Examples I to IV can be modified to avoid the use of the anhydrous alkali salts. This modification uses the free acid, cyclohexenyl, cyclopentenyl, and other alicyclic acetic acids with the appropriate aromatic aldehyde together with suitable catalysts, i. e., triethyl amine, anhydrous sodium or potassium acetate, anhydrous potassium carbonate, etc.

28 g. (0.2 m.) of cyclohexenyl acetic acid, 21.2 g. (0.2 m.) of benzaldehyde, 20.2 g. (0.2 m.) of triethyl amine and 61.2 g. (0.6 m.) of acetic anhydride were heated for 10–12 hours at 100–120° C. The reaction mixture was worked up as described for Example I yielding α(Δ¹-cyclohexenyl) cinnamic acid, M. P. 156–157° C.

Substitution of the cyclohexenyl acetic acid by cyclohexylidene acetic acid gave a comparable yield, but required a few additional hours of heating. Substitution of the triethyl amine by anhydrous potassium acetate likewise gave a good yield in the condensation.

In place of cyclohexenyl acetic acid or of cyclohexylidene acetic acid, and the similarly substituted homologous acids, there may be employed acetic acid and its homologues substituted by cyclo-hexanol, wherein both the hydroxyl and the acid group are joined to the same nuclear carbon. During the course of the reaction of such a cyclohexanol acetic acid with an aromatic aldehyde in the presence of acetic anhydride (or other saturated aliphatic acid anhydride), and of a catalyst like triethylamine, dehydration of the cyclohexanol acetic acid takes place with the formation of either or both of Δ¹-cyclohexenyl acetic acid and cyclohexylidene acetic acid, or homologous acids.

EXAMPLE VI

α-(Δ¹-4-methylcyclohexenyl)p-hydroxy-cinnamic acid

A mixture of 19.3 g. of anhydrous potassium Δ¹-4-methylcyclohexenyl acetate, 12.2 g. of p-hydroxybenzaldehyde and 100 cc. acetic anhydride was heated for ten hours at 110–115° C. The reaction mixture was cooled and the excess acetic anhydride decomposed with water. The reaction mixture was extracted with ether, the ether extracted with sodium carbonate solution and the sodium carbonate extract neutralized with dilute hydrochloric acid, treated with charcoal and filtered. The resulting compound was obtained in the form of a pale yellow solid melting at 176–178° C. The substituted cinnamic acid can be further purified by recrystallization from aqueous alcohol, aqueous acetone, or a mixture of benzene and alcohol.

In place of the anhydrous potassium salt described above, one may use the free acid $\Delta^1$-4-methyl cyclohexenyl acetic acid as outlined in Example V. Condensation can also be effected with 4-methyl cyclohexanol-1-acetic acid by using acetic anhydride as a dehydrating and condensing agent. In this type of condensation it is advantageous to use 3 moles of triethylamine in order to neutralize the acetic acid formed during the dehydration reaction.

Other alkyl substituted cycloaliphatic acetic acids such as 2-methyl cyclohexenyl acetic acid, 3-methyl cyclohexenyl acetic acid and the corresponding dimethyl acids may be used. The preparation of these acetic acids proceeds smoothly by the Reformatsky reaction, as indicated above for the 3,3,5-trimethylcyclohexenyl acetic acid.

EXAMPLE VII

α-(3,3,5-trimethylcyclohexyl)-β-(p-hydroxyphenyl) propionic acid

By the usual Reformatsky reaction between trimethylcyclohexanone, ethylbromacetate, zinc, and a mixture of benzene and toluene as solvent, there is obtained the ethyl 3,3,5-trimethylcyclohexanol-1 acetate which boils at 103–104° C./2 mm. Many variations may be made in this procedure; for example, choice of solvents, type of zinc, etc. We have found that by using granular zinc in a 50–50 mixture of benzene and toluene, good yields of the ethyl trimethylcyclohexanol acetate are obtained.

Saponification of the above ethyl acetate compound with alcoholic sodium hydroxide yields the 3,3,5-trimethylcyclohexanol-1 acetic acid, which, after recrystallization from petroleum ether, melts at 116–117° C.

When the ethyl acetate derivative described above is dehydrated by any of the usual agents, for example anhydrous HCl, fused potassium bisulfate, etc., there is obtained the unsaturated compound, ethyl 3,3,5-trimethylcyclohexylidene acetate or the ethyl 3,3,5-trimethyl-$\Delta^1$-cyclohexenyl acetate. The type of dehydrating agent used will determine which one of these two isomers is secured. The unsaturated compounds boiled at 76° C./1 mm. When these compounds are saponified with alcoholic sodium hydroxide, there is obtained the 3,3,5-trimethylcyclohexylidene acetic acid or the isomeric $\Delta^1$-3,3,5-trimethylcyclohexenyl acetic acid. One of these products which we have isolated, and which probably is the hexylidene compound, melts at 80–81° C. after recrystallization from petroleum ether.

By condensing 20 gm. of the trimethylcyclohexanol-1 acetic acid with 12 gm. of p-hydroxybenzaldehyde in the presence of 150 cc. of acetic anhydride with 40 cc. of triethylamine as catalyst, there is obtained, after working up the reaction mixture in the normal manner, α-($\Delta^1$-3,3,5-trimethylcyclohexenyl)-p-hydroxycinnamic acid. Satisfactory yields in this reaction were obtained when the reaction mixture described above was heated for a period of 25–35 hours at 100–110° C. The substituted cinnamic acid, after recrystallization from a mixture of methyl alcohol and water, melted at 181–182° C.

The substituted cinnamic acid, when reduced with Raney's alloy and aqueous alkali as mentioned in a previous example, yielded the α-(3,3,5-trimethylcyclohexyl)-β-(p-hydroxyphenyl) propionic acid. This substituted propionic acid, after recrystallization from aqueous alcohol, melted at 189–189.5° C.

EXAMPLE VIII

α-($\Delta^1$-Cyclohexenyl)-p-hydroxycinnamic acid

Ninety-three grams (0.5 m.) of ethylcyclohexanol-1 acetate, 61 gm. (0.5 m.) of p-hydroxybenzaldehyde, 150 gm. (1.5 m.) of triethylamine and 300 cc. of acetic anhydride were heated, preferably with stirring, for 25–35 hours at 100–110° C. At the end of the heating period the reaction mixture was cooled to 60° and the excess acetic anhydride cautiously decomposed by the addition of water. The resulting solution was poured into ice and the product extracted with ether. The ether solution was washed free of acetic acid, the ether evaporated, and the resulting residue, which was principally the ester of the condensation product, was saponified with either aqueous or alcoholic alkali. The saponified solution was then treated with carbon dioxide in order to convert the alkali to bicarbonate. After this treatment the solution was heated, treated with charcoal, and filtered. Upon acidification the α-($\Delta^1$-cyclohexenyl) p-hydroxycinnamic acid was precipitated and filtered. The product obtained melted at 191–193° C. after recrystallization from a mixture of acetone and water.

In place of the triethylamine, other organic amines may be used for catalyzing the condensation, as well as metallic salts such as sodium and potassium acetate.

α-(Cyclohexyl)-β-(p-hydroxyphenyl) propionic acid was obtained from α-($\Delta^1$-cyclohexenyl)-p-hydroxycinnamic acid by reducing 10 grams of the latter with Raney's alloy and aqueous alkali, as described in the Journal of Organic Chemistry, 9,175 (1944). The substituted propionic acid was isolated in the usual manner and after recrystallization from aqueous acetone melted at 180–181° C.

The above acids can be converted by the usual reactions into the corresponding salts; for example, the alkali metal salts, such as sodium and potassium, the alkaline earth metal salts, such as those of calcium and magnesium, etc., as by neutralization in known manner with the metal hydroxide or carbonate; and likewise into the amine salts, like those of mono-, di-, and triethyl amines, dimethylamino ethanol, etc.

As already indicated, and as illustrated by the above examples, the starting compounds may contain substituents like hydroxyl, alkyl, alkoxy and also ester groups, and in general groups which, with the aid of hydrolysis, can be converted into the hydroxy group. The alkyl groups are preferably lower aliphatic hydrocarbons like methyl and ethyl, while in addition to the methoxy group also the ethoxy and higher alkoxy groups can be present in place of the hydroxyl group. The ester groups are preferably of the lower aliphatic acids, like the acetate, propionate and butyrate. The hydroxyl group and groups convertible into hydroxyl are preferably attached to the benzaldehyde; thus, in addition to the p-hydroxy benzaldehyde specifically disclosed hereinabove, there may be used also methoxy and ethoxy benzaldehyde and likewise the acetoxy, propionoxy and butyroxy compounds which will yield the corresponding condensed compounds in which the functional substituents can, if desired, be converted into the hydroxyl group by known methods.

We claim:
1. Process for the manufacture of dicyclically substituted aliphatic carboxylic acids, which comprises heating and condensing a member of the group consisting of cyclohexanol acetic acid and its salts, wherein the hydroxyl and acetic acid groups are joined to the same carbon of the cyclohexane ring, with a benzaldehyde under substantially anhydrous conditions and in the presence of the anhydride of a lower fatty acid, whereby initially the cyclohexanol acetic acid is dehydrated to form the corresponding unsaturated compound, and the latter reacts with the benzaldehyde to produce an alicyclically and aromatically substituted alkene carboxylic acid.

2. Process for the manufacture of dicyclically substituted aliphatic carboxylic acids, which comprises heating and condensing a member of the group consisting of alicyclically substituted acetic acids and their salts, wherein the 1-carbon atom of the alicyclic ring has a double bond connected thereto and wherein the alicyclic ring has from 5 to 6 carbon atoms, with a benzaldehyde under substantially anhydrous conditions and in the presence of the anhydride of a lower fatty acid to produce an alicyclically and aromatically substituted alkene carboxylic acid.

3. Process for the manufacture of dicyclically substituted aliphatic carboxylic acids, which comprises heating and condensing $\Delta^1$-cyclohexenyl acetic acid with p-hydroxy benzaldehyde under substantially anhydrous conditions and in the presence of the anhydride of a lower fatty acid to produce an alicyclically and aromatically substituted alkene carboxylic acid.

4. Process for the manufacture of dicyclically substituted aliphatic carboxylic acids, which comprises heating and condensing $\Delta^1$-cyclohexenyl acetic acid with benzaldehyde under substantially anhydrous conditions and in the presence of the anhydride of a lower fatty acid to produce an alicyclically and aromatically substituted alkene carboxylic acid.

5. A compound of the formula

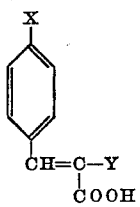

and its alkali and alkaline earth metal salts wherein Y is an alicyclic hydrocarbon radical having from 5 to 6 carbon atoms in the ring, and X is a member of the group consisting of hydrogen and hyroxyl.

6. $\alpha$-($\Delta^1$-Cyclohexenyl)-p-hydroxy cinnamic acid.

7. $\alpha$-($\Delta^1$-Cyclopentenyl)-p-hydroxy cinnamic acid.

8. $\alpha$-($\Delta^1$-Alkylcyclohexenyl) p-hydroxy-cinnamic acid.

9. $\alpha$-($\Delta^1$-Methylcyclohexenyl) p-hydroxy-cinnamic acid.

ERWIN SCHWENK.
DOMENICK PAPA.

REFERENCES CITED

The following references are of record in the file of this patent:

UNITED STATES PATENTS

| Number | Name | Date |
| --- | --- | --- |
| 2,265,184 | Miescher et al. | Dec. 9, 1941 |
| 2,341,016 | Brubaker | Feb. 8, 1944 |
| 2,469,415 | Schwenk et al. | May 10, 1949 |

OTHER REFERENCES

Adams et al., "Organic Reactions," vol. I pp. 223–228, 240–241 (1942).